(12) United States Patent
Welker et al.

(10) Patent No.: US 12,124,385 B2
(45) Date of Patent: Oct. 22, 2024

(54) BANDWIDTH ALLOCATION

(71) Applicant: NXP B.V., Eindhoven (NL)

(72) Inventors: James Andrew Welker, Leander, TX (US); Vaibhav Kumar, Austin, TX (US); Rohit Kumar Kaul, Austin, TX (US); Ankush Sethi, Austin, TX (US)

(73) Assignee: NXP B.V., Eindhoven (NL)

( * ) Notice: Subject to any disclaimer, the term of this patent is extended or adjusted under 35 U.S.C. 154(b) by 47 days.

(21) Appl. No.: 17/976,395

(22) Filed: Oct. 28, 2022

(65) Prior Publication Data
US 2024/0143519 A1    May 2, 2024

(51) Int. Cl.
*G06F 13/16* (2006.01)
*G06F 13/18* (2006.01)

(52) U.S. Cl.
CPC ........ *G06F 13/1626* (2013.01); *G06F 13/161* (2013.01); *G06F 13/18* (2013.01)

(58) Field of Classification Search
CPC ..... G06F 13/161; G06F 13/1605; G06F 13/18
See application file for complete search history.

(56) References Cited

U.S. PATENT DOCUMENTS

| | | | |
|---|---|---|---|
| 5,241,632 A | | 8/1993 | O'Connell et al. |
| 8,755,271 B2 | | 6/2014 | Matthews et al. |
| 2005/0071471 A1 | * | 3/2005 | Saenz .................. H04L 47/808 709/226 |
| 2009/0034460 A1 | | 2/2009 | Moratt et al. |
| 2011/0179248 A1 | * | 7/2011 | Lee ....................... G06F 13/364 710/242 |
| 2017/0017412 A1 | | 1/2017 | Luan et al. |
| 2022/0100567 A1 | * | 3/2022 | Krishnan .................. G06T 1/60 |

(Continued)

FOREIGN PATENT DOCUMENTS

WO    WO-2023051917 A1 *  4/2023   ......... G06F 13/1663

OTHER PUBLICATIONS

Yun, Heechul, Gang Yao, Rodolfo Pellizzoni, Marco Caccamo, and Lui Sha. "Memguard: Memory bandwidth reservation system for efficient performance isolation in multi-core platforms." In 2013 IEEE 19th Real-Time and Embedded Technology and Applications Symposium (RTAS), pp. 55-64. IEEE, 2013.*

(Continued)

*Primary Examiner* — Tracy A Warren

(57) ABSTRACT

Aspects of the disclosure are directed to allocating bandwidth. As may be implemented in accordance with one or more embodiments, respective amounts of bandwidth are allocated to respective application groups for each memory access cycle in a set of memory access cycles. Initial bonus bandwidth is provided to a first one of the application groups during one of the memory access cycles. The bonus bandwidth may include at least a portion of bandwidth allocated to and unused by one of the other respective application groups during the memory access cycle. Additional bonus bandwidth is selectively provided to the first application group during one of the memory access cycles based on the initial bonus bandwidth and a maximum amount of bonus bandwidth defined for the set of memory access cycles, in response to bandwidth allocated to one of the other respective application groups during the subsequent memory access cycle being unused.

18 Claims, 4 Drawing Sheets

(56) References Cited

U.S. PATENT DOCUMENTS

2022/0171549 A1* 6/2022 Saeed ................ G06F 3/0679
2023/0067749 A1* 3/2023 Srinivasan .......... G06F 12/0842

OTHER PUBLICATIONS

Awan, Muhammad Ali, Konstantinos Bletsas, Pedro F. Souto, Benny Akesson, and Eduardo Tovar. "Mixed-criticality scheduling with dynamic memory bandwidth regulation." In 2018 IEEE 24th International Conference on Embedded and Real-Time Computing Systems and Applications (RTCSA), pp. 111-117. IEEE, 2018.*

Farshchi, Farzad, Qijing Huang, and Heechul Yun. "Bru: Bandwidth regulation unit for real-time multicore processors." In 2020 IEEE Real-Time and Embedded Technology and Applications Symposium (RTAS), pp. 364-375. IEEE, 2020.*

* cited by examiner

BANDWIDTH ALLOCATION

BACKGROUND

In many communication environments, multiple applications/masters may utilize traffic, for instance as relative to a memory controller. Where limited bandwidth is available, it is challenging to efficiently utilize such bandwidth while ensuring that the various applications can access bandwidth when needed. For instance, it is important to ensure that a reasonable amount of bandwidth is made available to each application, and that certain applications do not dominate the use of such bandwidth in a manner that prevents others from utilization. This is particularly important for safety applications, such as those involving automotive systems. It is further inefficient to delay arbitration while waiting to assess whether other potential masters may initiate an access request.

SUMMARY

Various example embodiments are directed to issues such as those addressed above and/or others which may become apparent from the following disclosure concerning bandwidth allocation amongst different applications/devices, for instance as may be applicable for allocating access to resources such as memory. For instance, certain embodiments may involve providing dynamic freedom from interference with bandwidth allocation. Such embodiments may be employed in automotive applications in which multiple applications may be run on a single chip, and may further involve safety criticality.

Certain particular embodiments involve an apparatus and/or approach utilizing a memory interface such as DRAM, as may be used on automotive system on chips (SoCs). A freedom from interference arbitration scheme is utilized to ensure that QM (quality management) lower ASIL (automotive safety integrity level) applications do not block or impact higher ASIL applications. Such approaches may be implemented to mitigate or prevent single applications from consuming most or all bandwidth, for instance in the event of an attack in which a single application may request too much data from memory. Specific applications involve dynamic bandwidth allocation for memory with a bonus count scheme that ensures low latency while meeting desired bandwidth constraints for freedom from interference.

In accordance with a particular embodiment, respective amounts of bandwidth are allocated to respective application groups for each memory access cycle in a set of memory access cycles. Initial bonus bandwidth is provided to a first one of the application groups during one of the memory access cycles, in which the bonus bandwidth includes at least a portion of bandwidth allocated to, and unused by, one of the other respective application groups during the memory access cycle. Additional bonus bandwidth is selectively provided to the first application group during one of the memory access cycles based on the initial bonus bandwidth and a maximum amount of bonus bandwidth defined for the set of memory access cycles, in response to bandwidth allocated to one of the other respective application groups during the subsequent memory access cycle being unused. Bonus bandwidth may be similarly provided to other application groups, for which bonus allocation is authorized similarly.

In another embodiment, an apparatus includes interface circuitry to facilitate memory access by respective application groups, and allocation circuitry configured and arranged with the interface circuitry to allocate bandwidth to the respective application groups. For a set of memory access cycles, the allocation circuitry operates with the interface circuitry to allocate respective amounts of bandwidth to respective application groups for each memory access cycle in the set. Initial bonus bandwidth is provided to a first one of the application groups during one of the memory access cycles, in which (as above) the bonus bandwidth includes at least a portion of bandwidth allocated to and unused by one of the other respective application groups during the memory access cycle. Additional bonus bandwidth is selectively provided to the first application group during one of the memory access cycles based on the initial bonus bandwidth and a maximum amount of bonus bandwidth is defined for the set of memory access cycles, in response to bandwidth allocated to one of the other respective application groups during the subsequent memory access cycle being unused. The interface circuitry may, for example, be implemented with a transaction scheduler, and the allocation circuitry may utilize counters and related control logic.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
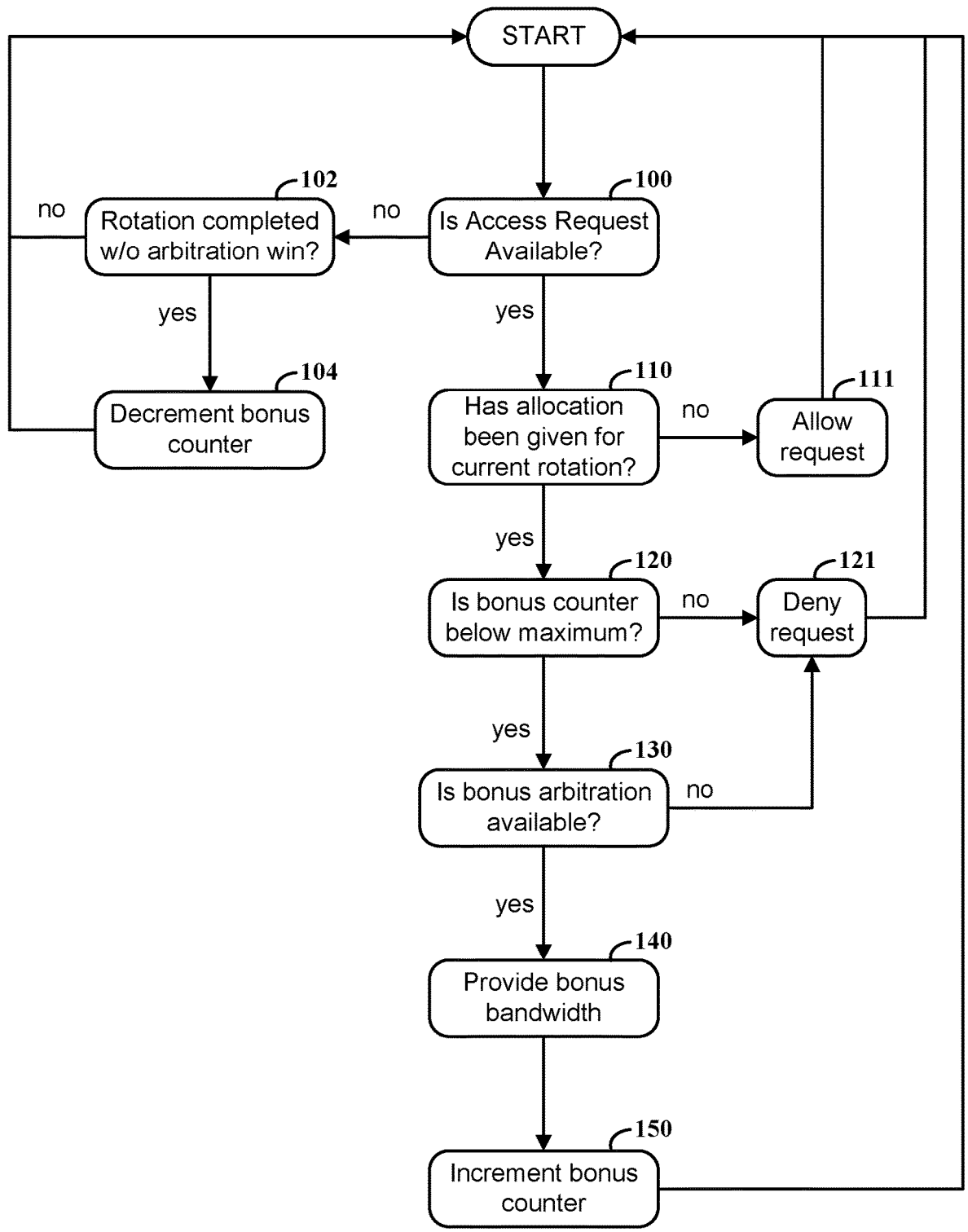
FIG. 1 is a flow diagram illustrating an example approach to allocating bandwidth, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving bandwidth allocation, and may address challenges to efficiencies of circuitry and related operation for bandwidth allocation implementations as discussed in the background above. In certain implementations, aspects of the present disclosure have been shown to be beneficial when used in the context of systems in which respective applications or nodes access a shared resource, such as a memory resource or local bus. Certain embodiments are directed to providing dynamic freedom from interference with bandwidth allocation, which may be implemented for a safety criticality system (e.g., automotive, and including instances in which safety criticality is mixed) having a memory controller. For instance, in automotive applications in which multiple applications are run on a single chip, bandwidth allocation can be provided while ensuring freedom from interference when accessing common resources such as memory. While not necessarily so limited, various aspects may be appreciated through the following discussion of non-limiting examples that use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. In addition, although aspects and features may in some cases be described in individual figures, it will be appreciated that features from one figure or embodiment can be combined with features of another figure or embodiment even though the combination is not explicitly shown or explicitly described as a combination.

Various embodiments are directed to automotive SoCs that utilize safety important (or critical) IP (intellectual property) cores, whose data may be processed on higher priority for safety critical needs. A freedom from interference arbitration scheme is implemented to prevent one master from consuming most or all memory bandwidth for a long period of time. A configurable freedom from interference arbitration scheme may be utilized while achieving high performance for each master. A memory controller may arbitrate in a round robin scheme based on IDs programmed in groups, for providing memory access by multiple masters, ensuring that no individual master can overwhelm the system and that other masters can continue making forward progress as long as their transactions have reached the memory controller.

In a particular application, bandwidth is allocated equally amongst different groups. The D_ID (domain ID) of the transaction can be passed with each transaction to a transaction scheduler. Transactions may stream in the order they are received. Freedom from interference (FFI) arbitration may allow certain groups to access a smaller percentage of the available bandwidth. In this context, FFI may involve the absence of cascading failures between two or more elements that could lead to the violation of a safety requirement.

In a specific implementation, four groups may be programmed with a specific domain ID, and FFI arbitration is enabled via configurable bits. A fifth group may be utilized for unallocated accesses. For each group (e.g., D_ID), there is a corresponding 4-bit GRP{0 . . . 3} D_ID. However, various numbers of bits may be used to suit particular applications. There is also a DEF_GRP_EN bit that can be set as the group for any transaction that does not have a D_ID mapping to any enabled groups. If DEF_GRP_EN is cleared and a transaction is issued to the controller with a D_ID that does not map to an enabled group, an error will be detected and an error response may be provided for that transaction. A default group may be implemented such that it does not throttle bandwidth to the other groups when it is disabled. In addition, another enable may be used specifically for group 3, GRP_3_AEN. If this bit is cleared and GRP_3_EN is cleared, then group three will not participate in the FFI arbitration (meaning, it cannot throttle the bandwidth of other groups). Multiple D_IDs may be programmed to different groups to provide more bandwidth for those groups.

When the FFI arbitration is running, it may have either 3, 4, or 5 arbitration points, pending the settings of GRP_3_AEN and DEF_GRP_EN. Each arbitration point is 16 cycles from the prior one, as this is the longest the arbitration can wait without stalling the interface. As long as arbitration wins every 16 cycles, transactions can continue to stream. After reaching the maximum arbitration points (as may be referred to as an arbitration sequence), a controller implementing such arbitration may go back to the first arbitration point. If there are no further transactions available, it may wait for a new transaction to arrive. Each group may win one time within each arbitration sequence, beyond which the controller may choose an oldest transaction to win arbitration, assuming its group has not been issued in the current sequence or if that group has not yet reached a bonus threshold yet. In such implementations, a given D_ID can be programmed to multiple groups to allow a certain D_ID to win multiple arbitration points within a sequence. After a sequence of the programmed number of arbitration points has completed, all groups are allowed to win arbitration again. This guarantees no group gets more bandwidth allocated than it is programmed to have.

The FFI arbitration facilitates short bursts of domain traffic to minimize latencies using a bonus count for each group. This may be enabled via a programmable SW field, allowing each group to carry out extra additional transactions (e.g., programmable from 1 to 31) when no other groups are available to win arbitration during a sequence. For example, if 2 bonus counts have won arbitration for a specific group, 2 full arbitration sequences must pass without that group winning arbitration to bring the counter back to zero. This can happen immediately, or it can wait until there are not transactions that can win arbitration during a given sequence.

The above-noted approach can be carried out in a variety of manners. For instance, each group may be assigned based on a master accessing the memory (e.g., a core) or a given thread (e.g., a core could send multiple IDs). The groups can also be set to each address a separate bank of memory. Arbitration cycles may refer to cycles in which the controller is allowed to win arbitration to still guarantee maximum overall bandwidth. An arbitration counter may be implemented with counter circuitry that increments through 'x' arbitration cycles, where 'x' is defined by the number of groups participating in FFI. A bonus counter threshold (e.g., 2) can be programmed, and bonus counters may be implemented for each group. Further, such embodiments may be implemented with a multitude of disparate memory interfaces, such as standard LPDDR4/LPDDR5 DRAMs and for other types of memory.

In a particular embodiment, bandwidth allocation is carried out as follows. Respective amounts of bandwidth (e.g., accesses) are allocated to respective application groups for each memory access cycle in a set of such memory access cycles. This may ensure, for example, that each allocation group has an ability to win arbitration for a portion of each cycle. Bonus bandwidth may be provided to one or more groups based on availability (e.g., if one of the groups does not use its allocated bandwidth) and a defined maximum/threshold amount of bonus bandwidth. For instance, initial bonus bandwidth may be provided to a first one of the application groups during one of the memory access cycles. Such bonus bandwidth may include a portion of bandwidth allocated to (and unused by) one of the other respective application groups during the memory access cycle. In this regard, access may be provided to each application group for each memory access cycle, such that the initial bonus bandwidth may be provided to the first group after it had been granted its allocated access. Additional bonus bandwidth may be selectively provided to the first application group during one of the memory access cycles based on the initial bonus bandwidth and a maximum amount of bonus bandwidth defined for the set of memory access cycles (e.g., where bandwidth allocated to one of the other respective application groups during the subsequent memory access cycle is unused).

The bonus bandwidth allocation/accesses may be tracked in a variety of manners. In various implementations, one or more counters are used in this regard. For instance, a counter value may be incremented each time that bonus bandwidth is assigned to a particular one of the application groups. A maximum amount of bonus bandwidth may be defined as a maximum a number of counts in the counter. Accordingly, additional bonus bandwidth may be provided in response to the counter having a value that is below the maximum number of counts. The counter may be decremented after the set of memory access cycles has passed and/or when one of the application groups has not won arbitration during the set of memory access cycles.

Providing bonus bandwidth, whether an initial (first) bonus or additional bonus, can be carried out in a variety of manners. For instance, selectively providing the additional bonus bandwidth to the first application group as noted above may include selecting to provide no bonus bandwidth in response to the maximum amount of bonus bandwidth being defined as an amount corresponding to the initial bonus bandwidth provided to the first application group. Further, more than one bonus access may be provided to a group during one of the memory access cycles in response to bandwidth being available for more than one bonus access during the one of the memory access cycles. In addition, bonus bandwidth may be provided to two or more of the application groups during one of the memory access cycles, where bandwidth is available.

Priorities and/or weighting may also be used in allocating bandwidth. For instance, where certain applications are deemed more important (e.g., for safety) those applications may be given some aspect of priority. In a particular embodiment, memory access is provided with a higher priority to accesses for the allocated amounts of bandwidth, relative to a lower priority given to accesses for the bonus bandwidth. Additional bandwidth may be provided on a hierarchy basis corresponding to a weighted priority assigned to respective ones of the application groups.

A variety of apparatuses, circuitry and other componentry may be implemented for carrying out the operations noted above. In a particular embodiment, an apparatus includes interface circuitry that facilitates memory access by respective application groups, and allocation circuitry that operates with the interface circuitry to allocate bandwidth to the respective application groups as follows. Respective amounts of bandwidth (e.g., accesses) are allocated to respective application groups for each memory access cycle in a set of such memory access cycles. For instance, one access may be allocated to each application group for each memory access cycle.

Bonus bandwidth may be provided to one or more groups based on availability (e.g., if one of the groups does not use its allocated bandwidth) and a defined maximum/threshold amount of bonus bandwidth. For instance, initial bonus bandwidth may be provided to a first one of the application groups during one of the memory access cycles. This may be provided after the first one of the allocation groups has been granted its allocated access during the one of the memory access cycles. Such bonus bandwidth may include a portion of bandwidth allocated to (and unused by) one of the other respective application groups during the memory access cycle. In this regard, access may be provided to each application group for each memory access cycle, such that the initial bonus bandwidth may be provided to the first group after it had been granted its allocated access. Additional bonus bandwidth may be selectively provided to the first application group during one of the memory access cycles based on the initial bonus bandwidth and a maximum amount of bonus bandwidth defined for the set of memory access cycles (e.g., where bandwidth allocated to one of the other respective application groups during the subsequent memory access cycle is unused).

The allocation circuitry may allocate a single memory access to each group during each of the memory access cycles, with bonus bandwidth is provided for unused memory accesses. In addition, the allocation circuitry may provide memory accesses within the bandwidth allocated to each respective application group as a higher priority than memory accesses provided via bonus bandwidth.

Bonus allocation may be tracked and implemented in a variety of manners. In a particular implementation, the allocation circuitry stores a data value indicative of a total amount of bonus bandwidth provided to each of the application groups during the set of memory access cycles, and decrement the stored data value after the set of memory cycles have concluded.

In another implementation, a counter circuit is used and the allocation circuitry increments a value in the counter each time that bonus bandwidth is assigned to the first one of the application groups. The maximum amount of bonus bandwidth may be defined as maximum a number of counts in the counter. The additional bonus may be provided in response to the counter having a value that is below the maximum number of counts. The allocation circuitry may decrement the counter after the set of memory access cycles has passed, when the first one of the application groups having not won arbitration during the set of memory access cycles, or both.

The allocation circuitry may selectively provide the additional bonus bandwidth in a variety of manners. For instance, no bonus bandwidth may be provided in response to the maximum amount of bonus bandwidth being defined as an amount corresponding to the initial bonus bandwidth provided to the first application group. More than one bonus access may be provided during one of the memory access cycles in response to bandwidth being available for the more than one bonus access during the one of the memory access cycles. A bonus access may be provided to two or more of the application groups during one of the memory access cycles, so that bandwidth for the accesses is available during the one of the memory access cycles.

Turning now to the figures, FIG. 1 is a flow diagram illustrating an example approach to allocating bandwidth for a given application group, in accordance with the present disclosure. Each of multiple application groups for a particular implementation (e.g., SoC) may follow a similar flowchart. The process begins by assessing whether an access request is available at block 100. Such an access request may involve the application group requesting a memory access. If an access request is available, the process continues at block 110 to assess whether allocation has been given to the application group for the current rotation (e.g., a base allocation given to each application group that has not yet been used). If the allocation has not yet been given, the request is allowed at 111 (without needing bonus) and the process returns to the "start" block. In this context, the "start" block may involve an idle type operation while waiting to receive an access request.

If the application group's allocation has already been given at 110, a bonus counter is assessed at block 120. If the counter is not below a maximum (e.g., bonus threshold has already been met), the request for bonus access is denied at block 121 and the process returns to the "start" block. If the bonus counter is below the maximum at block 120, indicating that the application group has not yet used all of its possible bonus access, the process continues at block 130 to assess whether bonus arbitration is available (e.g., if another application group is not accessing via its allocation). If arbitration is not available, the request is denied at 121 and the process continues accordingly. If arbitration is available at 130, bonus bandwidth is provided at block 140, following which a bonus counter is incremented at block 150 before returning to the "start" block.

Bonus counters for each application group may be decremented in accordance with one or more approaches. For instance, referring again to block 100, if an access request is not available (the application group is not requesting access), and if rotation is completed without a bonus arbitration win at block 102, the bonus counter for the application group is decremented at 104 and the process returns to the "start" block. Similarly if the rotation has not been completed without an arbitration win at 102, the process also returns to the "start" block.

Figure 2A:
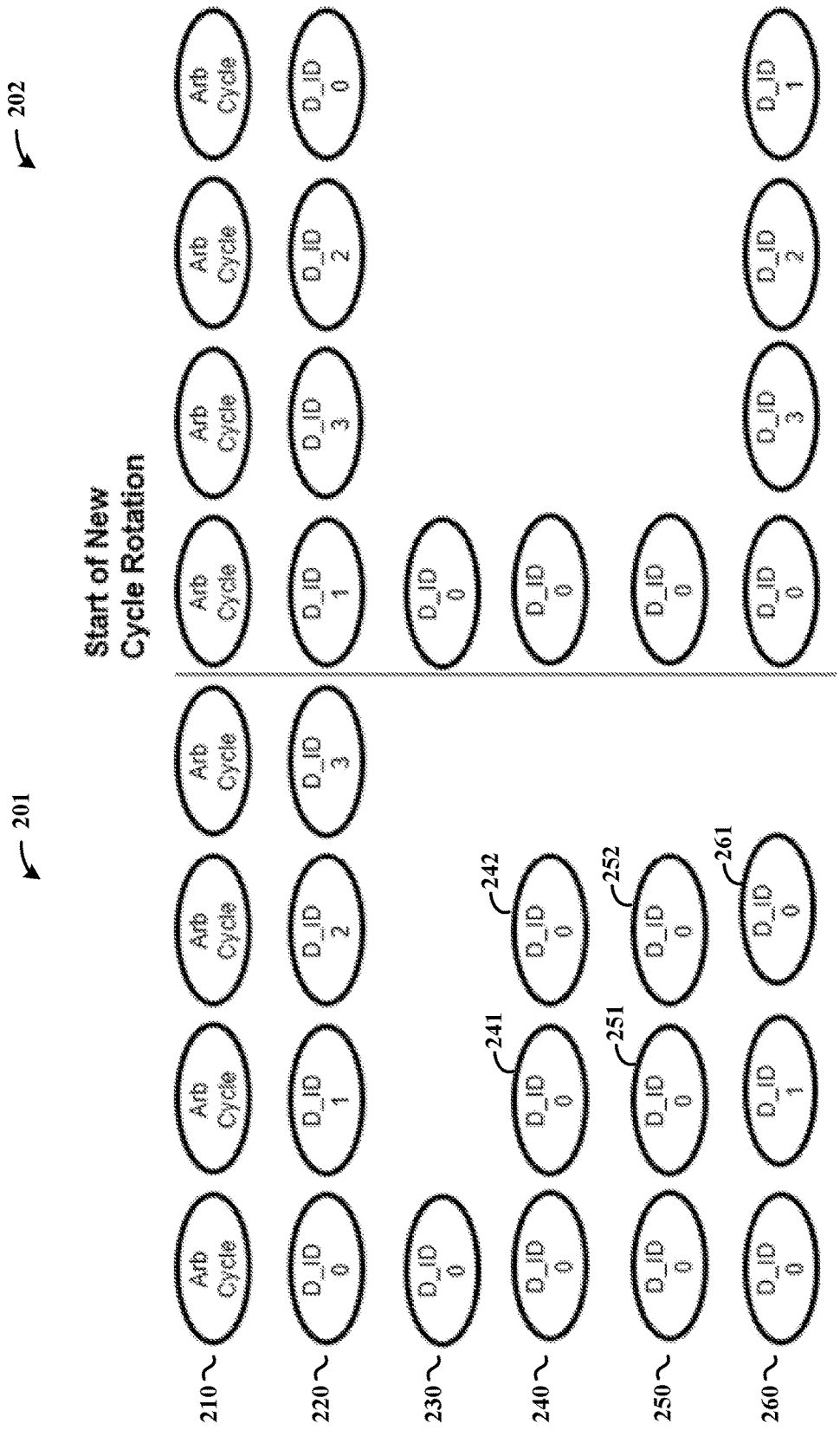
FIG. 2A and FIG. 2B show respective cycle rotations of an example full cycle having four respective rotations, in accordance with the present disclosure.
Figure 2B:
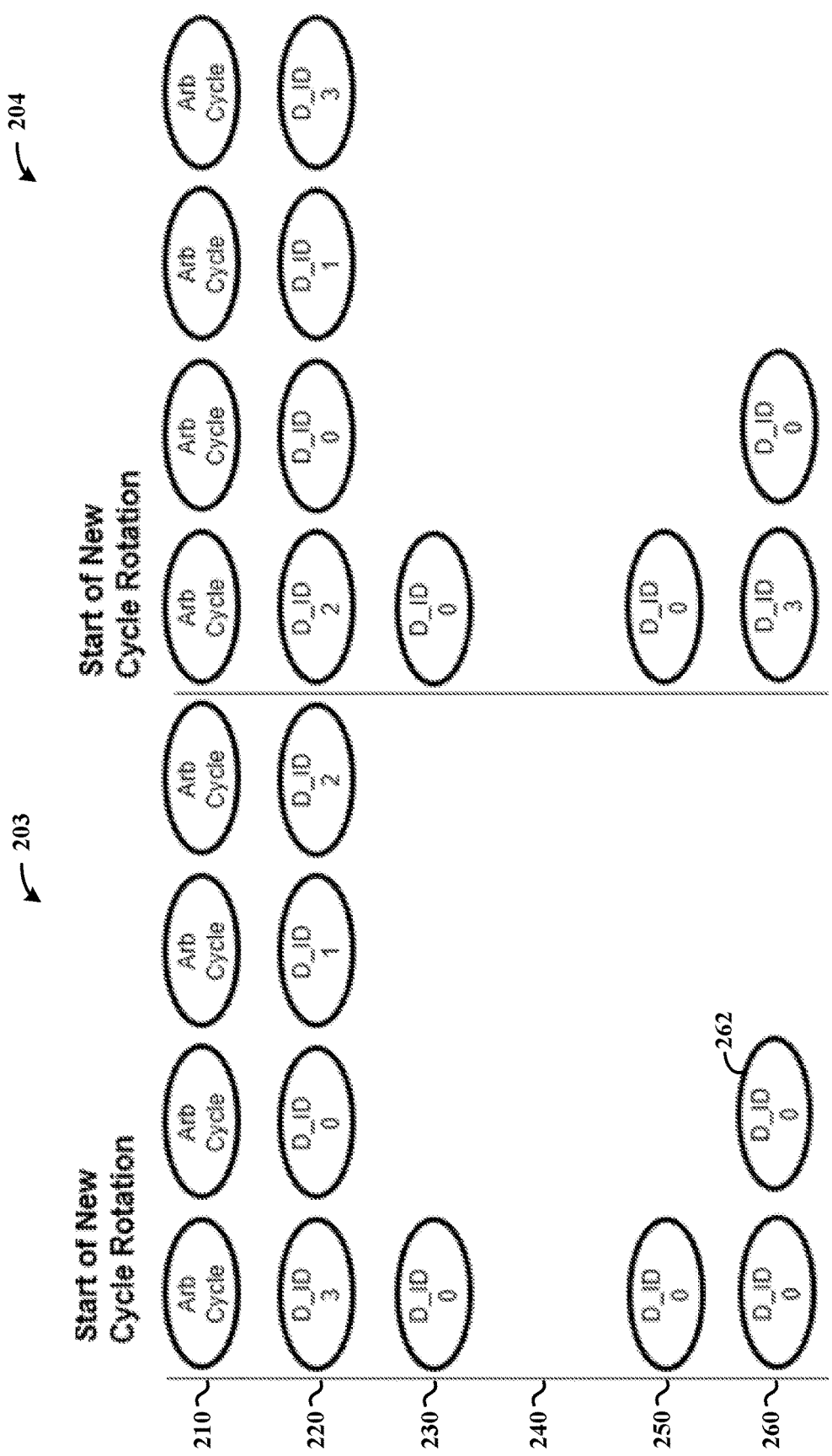

FIG. 2A and FIG. 2B show respective cycle rotations of an example full cycle having four respective rotations, in accordance with the present disclosure. This approach may be implemented in accordance with the process depicted in FIG. 1, or otherwise herein. Arbitration cycles are shown at 210 with example access scenarios 220, 230, 240, 250 and 260 shown for four arbitration groups D_ID0, D_ID1, D_ID2, and D_ID3, with each being implemented in accordance with one or more embodiments. Referring to 220, each of the four access groups utilizes its allocated access for each of cycle rotations 201, 202, 203 and 204, each of which make up a full cycle (e.g., after which bonus counters may be decremented). These accesses may be given in order of receipt and/or based on an assigned priority, for instance noting that the order of cycle rotation 201 is different from the order of cycle rotation 202.

Referring to example 230, group "0" is given its allocated access in each cycle rotation, and no other group utilizes its access. No bonus allocations are given to group "0" (e.g., the group may request only one access per cycle rotation).

Referring to example 240, group "0" is given its allocated access in the cycle rotation 201 along with two bonus accesses 241 and 242. This access may be given, for example, based on a lack of use of allocated accesses by the other groups during cycle rotation 201. In cycle rotation 202, group "0" is given its allocated access and thereafter makes no further access request in cycle rotations 203 and 204. This approach may provide efficient access, for example, relative to that shown with Example 230, where group 0 might provide its access requests sooner. Example 250 is similar, with group "0" taking its allocated accesses in cycle rotations 203 and 204 as well, and being given bonus accesses 251 and 252. Such an approach may be carried out, for example, where the maximum bonus allocation is set to two for the full cycle.

Referring to example 260 and cycle rotation 201, groups "0" and "1" are given their allocated accesses and group "0" is given a bonus access 261. In cycle rotation 202, each of the four groups is given its allocated access. In cycle rotation 203, group "0" is given its allocated access and its second bonus access 262. In cycle rotation 204, groups "0" and "3" are given their allocated access. This approach may be present when, for example, group "0" requests bonus access in cycle rotation 202 but is denied as all other groups are using their allocated bandwidth, with the bonus then given in cycle rotation 203.

Figure 3:
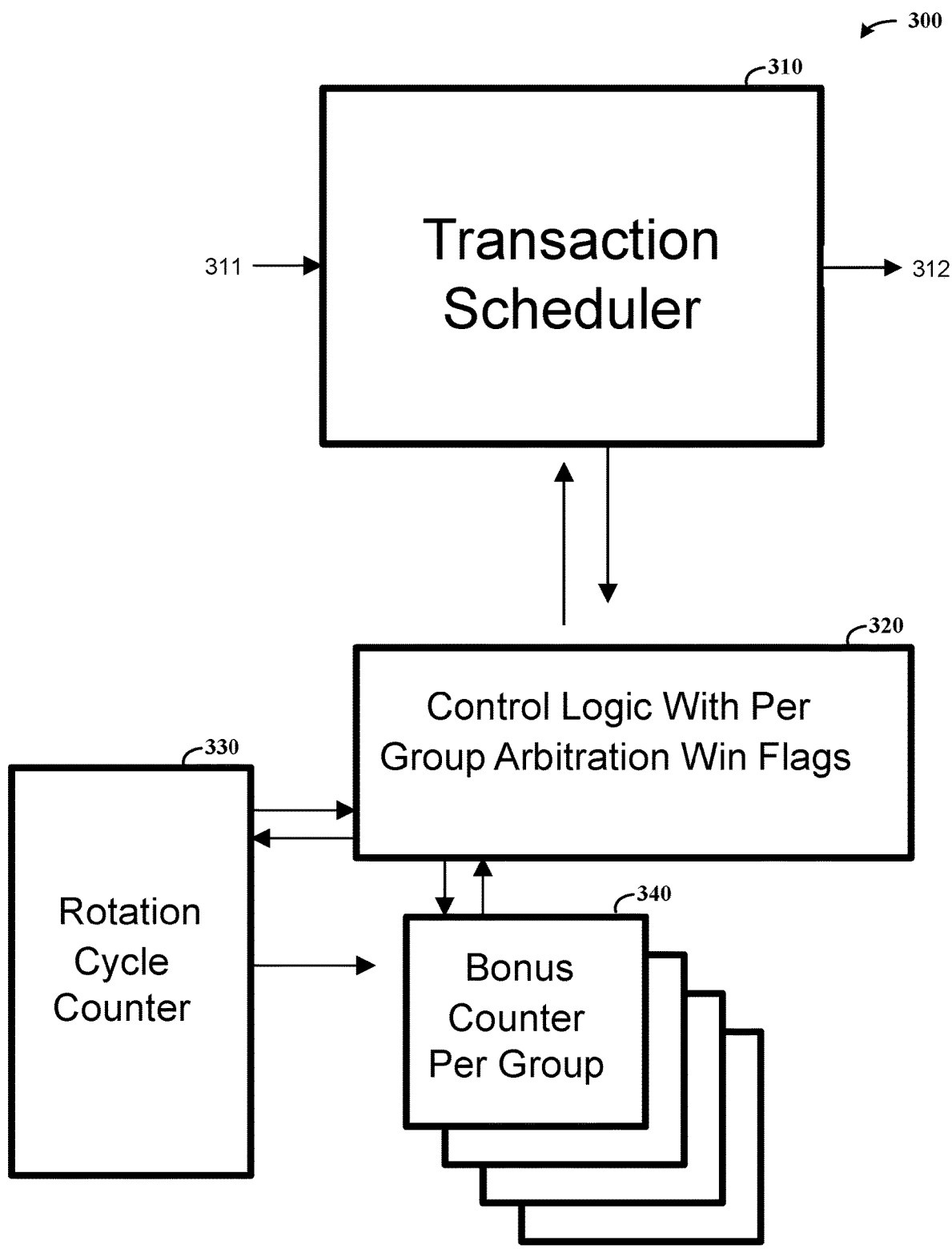
FIG. 3 is an apparatus for allocating bandwidth, in accordance with the present disclosure.

FIG. 3 shows an apparatus 300 for allocating bandwidth, in accordance with the present disclosure. The apparatus 300 includes a transaction scheduler 310, control logic 320, a rotation cycle counter 330 and respective bonus counters for each group, with bonus counter 340 labeled by way of example. The transaction scheduler operates (e.g., as an interface) to assess access requests 311 and provide memory access/command 312. The rotation cycle counter 330 may continually count and reset each time it reaches the end of an arbitration rotation. The control logic 320, rotation cycle counter 330, and bonus counters (including 340) may collectively form part of allocation circuitry.

The bonus counter 340 counts bonus allocations given for the respective group to which it is assigned. If any group did not have a win during the rotation, the group's bonus counter may be decremented by one. The control logic 320 may set a bit for each group that wins arbitration during a rotation, and clears all flags after the rotation. If there is an arbitration cycle where no group 'without a flag set' is available, another group may be given a bonus win, and its bonus counter is incremented. Once a group's bonus counter reaches a maximum or threshold value, it cannot win anymore bonus wins (until the counter decrements). The maximum can be fixed or programmable (e.g., as provided by a configuration register). The transaction scheduler 310 may hold many transactions that it is arbitrating.

As examples, the specification describes and/or illustrates aspects useful for implementing the claimed disclosure by way of various circuits or circuitry which may be illustrated as or using terms such as blocks, modules, device, system, unit, controller, counter, memory, scheduler, control logic and/or other circuit-type depictions (e.g., reference numerals 310, 320, 330 and 340 of FIG. 3 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing arbitration and bonus counting. Yet another process or method in this context would be recognized in connection with the functions/activities associated with FIG. 1 and FIGS. 2A and 2B.

For example, in certain of the above-discussed embodiments, one or more modules are discrete logic circuits or programmable logic circuits configured and arranged for implementing these operations/activities, as may be carried out in the approaches shown in FIG. 1 and FIGS. 2A and 2B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with FIG.

1 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the specification may make reference to a "first counter", a "second counter", etc., where the counter might be replaced with terms such as counter circuitry, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, while examples are given for allocating bandwidth for memory access, other allocation applications may be utilized, such as to allocate access to a system or SOC bus. As another example, fewer or more groups, or larger or smaller bonus threshold values, may be utilized. Such modifications do not depart from the true spirit and scope of various aspects of the disclosure, including aspects set forth in the claims.

What is claimed is:

1. A method comprising:
   for a set of memory access cycles, allocating respective amounts of bandwidth to respective application groups for each memory access cycle in the set,
   providing initial bonus bandwidth to a first one of the application groups during one of the memory access cycles, the bonus bandwidth including at least a portion of bandwidth allocated to and unused by one of the other respective application groups during the memory access cycle, and
   selectively providing additional bonus bandwidth to the first application group during one of the memory access cycles based on the initial bonus bandwidth and a maximum amount of bonus bandwidth defined for the set of memory access cycles, in response to bandwidth allocated to one of the other respective application groups during the subsequent memory access cycle being unused; and providing memory access with a higher priority to accesses for the allocated amounts of bandwidth, relative to a lower priority given to accesses for the bonus bandwidth.

2. The method of claim 1, including incrementing a value in a counter each time that bonus bandwidth is assigned to the first one of the application groups, wherein the maximum amount of bonus bandwidth is defined as a maximum number of counts in the counter, and wherein providing the additional bonus includes providing the additional bonus in response to the counter having a value that is below the maximum number of counts.

3. The method of claim 2, further including decrementing the counter after the set of memory access cycles has passed.

4. The method of claim 2, further including decrementing the counter in response to the first one of the application groups having not won arbitration during the set of memory access cycles.

5. The method of claim 1, wherein selectively providing the additional bonus bandwidth to the first application group includes selecting to provide no bonus bandwidth in response to the maximum amount of bonus bandwidth being defined as an amount corresponding to the initial bonus bandwidth provided to the first application group.

6. The method of claim 1, wherein selectively providing the additional bonus bandwidth includes providing more than one bonus access during one of the memory access cycles in response to bandwidth being available for more than one bonus access during the one of the memory access cycles.

7. The method of claim 1, wherein providing the bonus bandwidth includes providing a bonus access to at least two of the application groups during one of the memory access cycles, in response to bandwidth being available for the at least two bonus accesses during the one of the memory access cycles.

8. The method of claim 1, wherein allocating respective amounts of bandwidth to respective application groups includes allocating one access to each application group for each memory access cycle, and wherein providing the initial bonus bandwidth includes providing bonus access to the first one of the application groups after the first one of the application groups has been granted its allocated access during the one of the memory access cycles.

9. The method of claim 1, wherein providing the bonus bandwidth and selectively providing the additional bandwidth includes providing memory accesses based on a hierarchy corresponding to a weighted priority assigned to respective ones of the application groups.

10. An apparatus comprising:
    interface circuitry configured to facilitate memory access by respective application groups; and
    allocation circuitry configured and arranged with the interface circuitry to allocate bandwidth to the respective application groups, by:
      for a set of memory access cycles, allocating respective amounts of bandwidth to respective application groups for each memory access cycle in the set,
      providing initial bonus bandwidth to a first one of the application groups during one of the memory access cycles, the bonus bandwidth including at least a portion of bandwidth allocated to and unused by one of the other respective application groups during the memory access cycle, and
    selectively providing additional bonus bandwidth to the first application group during one of the memory access cycles based on the initial bonus bandwidth and a maximum amount of bonus bandwidth defined for the set of memory access cycles, in response to bandwidth allocated to one of the other respective application groups during the subsequent memory access cycle being unused, wherein the allocation circuitry is configured to provide memory accesses within the bandwidth allocated to each respective application group as a higher priority than memory accesses provided via bonus bandwidth.

11. The apparatus of claim 10, wherein each of the memory access groups is allocated a single memory access during each of the memory access cycles, and bonus bandwidth is provided by providing an unused one of the allocated memory accesses as a bonus memory access, for one of the memory access cycles, to one of the application groups having used its allocated memory access for the one of the memory access cycles.

12. The apparatus of claim 10, wherein the allocation circuitry is configured to:
   store a data value indicative of a total amount of bonus bandwidth provided to each of the application groups during the set of memory access cycles; and
   decrement the stored data value after the set of memory cycles has concluded.

13. The apparatus of claim 10, further including a counter circuit, wherein the allocation circuitry is configured to increment a value in the counter circuit each time that bonus bandwidth is assigned to the first one of the application groups, wherein the maximum amount of bonus bandwidth is defined as a maximum number of counts in the counter circuit, and to provide the additional bonus by providing the additional bonus in response to the counter circuit having a value that is below the maximum number of counts.

14. The apparatus of claim 13, wherein the allocation circuitry is configured to decrement the counter circuit in response to a condition selected from the group of: after the set of memory access cycles has passed, the first one of the application groups having not won arbitration during the set of memory access cycles, and a combination thereof.

15. The apparatus of claim 10, wherein the allocation circuitry is configured to selectively provide the additional bonus bandwidth to the first application group by selecting to provide no bonus bandwidth in response to the maximum amount of bonus bandwidth being defined as an amount corresponding to the initial bonus bandwidth provided to the first application group.

16. The apparatus of claim 10, wherein the allocation circuitry is configured to selectively provide the bonus bandwidth by providing more than one bonus access during one of the memory access cycles in response to bandwidth being available for the more than one bonus access during the one of the memory access cycles.

17. The apparatus of claim 10, wherein the allocation circuitry is configured to selectively provide the bonus bandwidth by providing a bonus access to at least two of the application groups during one of the memory access cycles, in response to sufficient bandwidth being available during the one of the memory access cycles.

18. The apparatus of claim 10, wherein the allocation circuitry is configured to allocate the respective amounts of bandwidth to the respective application groups by allocating one access to each application group for each memory access cycle, and to provide the initial bonus bandwidth by providing bonus access to the first one of the application groups after the first one of the allocation groups has been granted its allocated access during the one of the memory access cycles.

* * * * *